(12) United States Patent
Lubenski et al.

(10) Patent No.: US 10,939,348 B2
(45) Date of Patent: Mar. 2, 2021

(54) RAN FOR MULTIMEDIA DELIVERY

(71) Applicant: Parallel Wireless, Inc., Nashua, NH (US)

(72) Inventors: Zeev Lubenski, North Andover, MA (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/717,687

(22) Filed: Dec. 17, 2019

(65) Prior Publication Data

US 2020/0120568 A1   Apr. 16, 2020

Related U.S. Application Data

(63) Continuation of application No. 16/243,002, filed on Jan. 8, 2019, now Pat. No. 10,512,015, which is a (Continued)

(51) Int. Cl.
*H04W 36/22* (2009.01)
*H04L 1/18* (2006.01)
(Continued)

(52) U.S. Cl.
CPC .......... *H04W 36/22* (2013.01); *H04B 17/318* (2015.01); *H04B 17/336* (2015.01); *H04B 17/3913* (2015.01); *H04L 1/1812* (2013.01); *H04L 1/1874* (2013.01); *H04L 1/1893* (2013.01); *H04W 28/0205* (2013.01); *H04W 36/0011* (2013.01); *H04L 1/0002* (2013.01); (Continued)

(58) Field of Classification Search
CPC ............. H04W 36/22; H04W 28/0205; H04W 36/0011; H04W 36/32; H04W 36/023; H04W 88/16; H04W 84/042; H04B 17/318; H04B 17/3913; H04B 17/336; H04L 1/1812; H04L 43/16; H04L 1/0002
See application file for complete search history.

(56) References Cited

U.S. PATENT DOCUMENTS

2006/0120326 A1   6/2006 Takeuchi et al.
2013/0003708 A1   1/2013 Ko et al.
(Continued)

*Primary Examiner* — Afshawn M Towfighi
(74) *Attorney, Agent, or Firm* — Michael Y. Saji; David W. Rouille (57) ABSTRACT

A method is disclosed for avoiding unnecessary keepalive data transfers, comprising: receiving, at an upstream TCP connection endpoint in a radio access network (RAN) from an operator core network, an Internet Protocol (IP) packet; performing, at the upstream TCP connection endpoint, shallow packet inspection on the IP packet; and forwarding the IP packet to the downstream TCP connection endpoint in the RAN if the IP packet is not a keepalive packet, based on the performed shallow packet inspection. The upstream TCP connection endpoint in the RAN may be one of a nodeB, an eNodeB, a base transceiver station (BTS), a coordinating server, and a mobile edge computing (MEC) gateway. The downstream TCP connection endpoint in the RAN may be one of the nodeB, the eNodeB, or the base transceiver station (BTS).

6 Claims, 8 Drawing Sheets

Related U.S. Application Data continuation of application No. 16/012,105, filed on Jun. 19, 2018, now Pat. No. 10,206,157, which is a continuation of application No. 15/260,315, filed on Sep. 8, 2016, now Pat. No. 10,004,019.

(60) Provisional application No. 62/215,562, filed on Sep. 8, 2015.

(51) Int. Cl.
*H04B 17/336* (2015.01)
*H04W 36/00* (2009.01)
*H04B 17/318* (2015.01)
*H04B 17/391* (2015.01)
*H04W 28/02* (2009.01)
*H04L 1/00* (2006.01)
*H04W 88/16* (2009.01)
*H04W 84/04* (2009.01)
*H04W 36/02* (2009.01)
*H04W 36/32* (2009.01)

(52) U.S. Cl.
CPC ... *H04L 2001/0097* (2013.01); *H04W 36/023* (2013.01); *H04W 36/32* (2013.01); *H04W 84/042* (2013.01); *H04W 88/16* (2013.01)

(56) References Cited

U.S. PATENT DOCUMENTS

| | | |
|---|---|---|
| 2014/0335881 A1 | 11/2014 | Rubin et al. |
| 2015/0222536 A1 | 8/2015 | Bergman |
| 2018/0176039 A1* | 6/2018 | Shi .................. H04W 76/12 |
| 2018/0242204 A1* | 8/2018 | Zhu .................. H04W 36/00 |

* cited by examiner

RAN FOR MULTIMEDIA DELIVERY

CROSS-REFERENCE TO RELATED APPLICATIONS

This application is a continuation of, and claims benefit under 35 U.S.C. § 120 of, U.S. patent application Ser. No. 16/243,002, filed Jan. 8, 2019 and entitled "RAN for Multimedia Delivery," which itself is a continuation of, and claims benefit under 35 U.S.C. § 120 of, U.S. patent application Ser. No. 16/012,105, filed Jun. 19, 2018 and entitled "RAN for Multimedia Delivery," which itself is a continuation of, and claims benefit under 35 U.S.C. § 120 of, U.S. patent application Ser. No. 15/260,315, filed Sep. 8, 2016 and entitled "RAN for Multimedia Delivery," which itself claims the benefit of priority under 35 U.S.C. § 119(e) of U.S. Provisional Patent Application No. 62/215,562, filed on Sep. 8, 2015 and entitled "RAN for Multimedia Delivery," each of which is hereby incorporated by reference in its entirety for all purposes. Additionally, U.S. Pat. No. 8,867,418, "Methods of Incorporating an Ad Hoc Cellular Network into a Fixed Cellular Network," filed Feb. 18, 2014, and U.S. patent application Ser. No. 14/936,267, "Self-Calibrating and Self-Adjusting Network," filed Nov. 9, 2015, are each incorporated in their entireties for all purposes, respectively.

BACKGROUND

On today's mobile networks, it is desirable to provide fast, responsive mobile video. However, this is technically challenging because video requires high data rates and low latency. As well, handling a small number of video streams is relatively simple, but as the number of video streams goes up, the bandwidth required increases as a multiple of the number of streams, which rapidly becomes unsustainable with tens or hundreds of users watching multi-megabit video streams.

One traditional way that video performance can be improved is by caching popular video files and serving them from a content cache, which can be located at the edge of the public Internet or within the operator core network, e.g., at a content delivery network (CDN). The content cache can be accessed via the operator core network with lower latency and with fewer throughput issues on its way to the operator core network. However, this approach does not provide any particular advantages for dealing with the constraints of mobile backhaul and the mobility management required for supporting wireless mobile users.

SUMMARY

In one embodiment, a system for dynamic content rerouting is disclosed, comprising: an operator core network; a plurality of mesh network nodes comprising a mesh network in communication with the operator core network, the mesh network nodes each providing a radio access network to user equipments; and a gateway node acting as a gateway to the operator core network for the mesh network, wherein the gateway node further comprises a routing management function configured to push routes to the plurality of mesh network nodes for different types of traffic, each of the routes comprising a path through the mesh network to the operator core network.

The operator core network may be a long term evolution (LTE) evolved packet core (EPC), the plurality of mesh network nodes may each be multi-radio access technology (multi-RAT) nodes with Wi-Fi mesh capability, and the mesh network may have a wired backhaul connection to the operator core network or a wireless macro cell backhaul connection to the operator core network. The routing management function may push a first route to the plurality of mesh network nodes identifying a first mesh egress route and a second route to the plurality of mesh network nodes identifying a second mesh egress route.

The routing management function may push a first route to the plurality of mesh network nodes for downlink traffic and a second route to the plurality of mesh network nodes for uplink traffic; or may push a first route to the plurality of mesh network nodes for a video content type and a second route to the plurality of mesh network nodes for a non-interactive content type; or may push a first route to the plurality of mesh network nodes for a metered content type and a second route to the plurality of mesh network nodes for a non-metered content type; or may push a particular route to the plurality of mesh network nodes for a particular user device.

Each of the mesh network nodes may perform shallow packet inspection to determine a 5-tuple comprising a source Internet protocol (IP) address, a destination IP address, a source IP port, a destination IP port, and an IP protocol type of a received packet, and to select a route to the received packet based on the determined 5-tuple.

The routing management function may push updated routes in case of a failure scenario.

In another embodiment, a system architecture is disclosed, comprising: an operator core network; a plurality of mesh network nodes comprising a mesh network in communication with the operator core network, the mesh network nodes each providing a radio access network to user equipments; and a gateway node acting as a gateway to the operator core network for the mesh network, the plurality of mesh network nodes further comprising: a first mesh network node configured to utilize the mesh network to connect to the operator core network, a second mesh network node configured to utilize an unlicensed Wi-Fi connection to connect to the operator core network, and a third mesh network node configured to utilize a licensed wireless connection to connect to the operator core network. The gateway node may further comprise a content caching module for caching content to be delivered to users.

In another embodiment, a method is disclosed for delivering a packet data flow across a radio access network (RAN), comprising: receiving, at an upstream gateway node, an Internet Protocol (IP) data flow; sending, from the upstream gateway node, the IP data flow to a RAN; receiving, at the upstream gateway node, a congestion control message from the RAN based on a request for retransmission of the IP data flow at the RAN to a user equipment (UE); and performing, at the upstream gateway node, IP flow control of the IP data flow based on the congestion control message.

The RAN may be an eNodeB in a Long Term Evolution (LTE) network. The method may further comprise buffering, at the upstream gateway node, the IP data flow. The congestion flow control message can be received at the upstream gateway node using an X2 application protocol (X2AP) message. The congestion flow control message can be a message indicating that: a hybrid automatic repeat request (HARQ) request was received at the RAN; that a radio modulation change is imminent; that a signal to noise ratio at an eNodeB for the UE has crossed a threshold; or that a UE is expected to perform a handover. Performing, at the upstream gateway node, IP flow control may comprise:

avoiding IP retransmissions and backoff; buffering the IP data flow; or sending IP retransmission requests to cause the IP data flow to be regulated at a particular data rate. The method may further comprise maintaining, at the upstream gateway node, a transport control protocol (TCP) timer for performing IP flow control of the data flow, and maintaining, at the RAN, a hybrid automatic repeat request (HARQ) timer. The IP data flow may be a video data flow. The method may further comprise performing transcoding or transrating of a video data flow at the upstream gateway node.

In another embodiment, a method is disclosed for avoiding unnecessary keepalive data transfers, comprising: receiving, at an upstream gateway node between a radio access network (RAN) and an operator core network, an Internet Protocol (IP) packet; performing, at the upstream gateway node, shallow packet inspection on the IP packet; and forwarding the IP packet to the RAN if the IP packet is not a keepalive packet, based on the performed shallow packet inspection.

The RAN may be a base transceiver station (BTS), nodeB, or evolved nodeB (eNodeB). The shallow packet inspection may be configured to determine a 5-tuple comprising a source Internet protocol (IP) address, a destination IP address, a source IP port, a destination IP port, and an IP protocol type of a received packet. The shallow packet inspection may be configured to compare a value of a keepalive field on the keepalive packet with a known value for a keepalive packet of the keepalive field, the value of the keepalive field being set by an upstream node.

The method may further comprise setting, at the upstream gateway node, a keepalive field on the keepalive packet to a keepalive field value, and identifying, at the RAN, the IP packet as a keepalive packet based on the set keepalive field value. The method may further comprise allocating fewer resource blocks to deliver the keepalive packet at a scheduler at the RAN. The method may further comprise reducing a transport control protocol (TCP) connection close timer at a gateway in a wireless operator core network to reduce a likelihood of radio access bearer (RAB) reestablishment due to reception of additional data over a half-closed TCP connection.

In another embodiment, a method is disclosed for reducing packet loss during mobile device handover, comprising: prospectively sending, from a radio access network (RAN) node to an upstream gateway node in communication with an operator core network, a handover notification that a user equipment (UE) will be handed over from a source base station to a target base station; buffering, at the upstream gateway node, internet protocol (IP) packets in an IP packet flow instead of forwarding the IP packets to the source base station; and delivering the buffered IP packets from the upstream gateway node to the target base station after completion of handover of the UE, thereby handing over the UE from the source base station to the target base station with a reduction of packet loss.

Prospectively sending the handover notification may occur at the source base station or at the target base station. Prospectively sending the handover notification may be based on determined UE velocity, measured signal to noise ratio (SNR) falloff, or a handover request message from the UE. The method may further comprise acting, at the upstream gateway node, as a transparent back to back user agent (B2BUA) toward a source of the IP packet flow and toward the target base station. The IP packet flow may be a video packet flow, and the method may further comprise performing, at the upstream gateway node, transrating or transcoding of the IP packet flow. The IP packet flow may be a video packet flow, and the method may further comprise requesting, from the upstream gateway node to a source content server of the IP packet flow, transcoding or transrating of the IP packet flow.

DETAILED DESCRIPTION

An architecture and certain methods are described for improving the performance of video and other real-time data streams on mobile networks. A mobile edge computing (MEC) platform is described wherein a gateway node at the edge of the operator core network, e.g., between the radio access network and the rest of the core network, operates to improve performance of video as it passes through the network.

As well, an architecture is described for providing flexible routing in a mesh network to ensure that video is handled using an appropriate route through the mesh network, i.e., a dynamic content routing capability, even as the mesh network is used to provide multiple backhaul links, the multiple backhaul links thereby providing a bigger pipe that reduces or eliminates backhaul bottlenecks. As used herein, backhaul is used to mean a network link from a radio access network node, such as a Long Term Evolution (LTE) eNodeB, to an operator core network or to the public Internet. Backhaul links that may be provided may include a license-assisted backhaul or in-band backhaul (LAB) modality, an unlicensed assist (ULA) backhaul modality, or various types of wired backhaul modalities such as Ethernet or fiber. Backhaul links may also include mesh links to other nodes in a mesh network, with one or more of the mesh nodes providing a mesh egress backhaul link to the operator core network or to the public Internet. LAB is similar to license-assisted access (LAA) and makes it possible to aggregate LTE and unlicensed spectrum for backhaul and to enable an upstream MEC gateway to make decisions as to what spectrum to use to deliver data.

The MEC gateway may provide a self-organizing network (SON) capability, a content caching capability, a back-to-back user agent (B2BUA)/proxy capability, a RAN virtualization capability to present a virtualized representation of RAN nodes to the core network, and other capabilities as elsewhere discussed herein and as discussed in the applications incorporated by reference above. The MEC gateway may make decisions based on quality of service (QoS), guaranteed QoS for different types of applications (e.g., VoLTE, mobile video, etc.), and other factors. Decisions may also be made based on network topology, congestion, predictive analysis of handovers, and other factors. The MEC gateway may make routing decisions and may push these down as policies or as routes to each node in the mesh network. The MEC gateway may, for example, instruct a base station to offload video traffic onto unlicensed spectrum and to give other types of traffic onto licensed spectrum. Policies may be obtained from a policy server or determined at the MEC gateway.

The mesh network may be made up of multi-radio access technology (multi-RAT) nodes with software-defined capabilities, multi-mode, multi-band radios, and self-healing and resilient mesh capability to route around problems and to reestablish links that have become congested or have failed. The mesh nodes may use Wi-Fi as unlicensed assist (ULA) backhaul to connect to each other over unlicensed spectrum, complementing existing wired backhaul while enabling resilience. The mesh network may make up a heterogeneous network, in combination with other types of nodes, such as macro cells. In some instances, no wired backhaul may be used, with only power being needed, in conjunction with the wireless backhaul modalities mentioned herein; in other instances batteries may be used. One antenna may be reserved for backhaul, while one or more additional antennas may be used for providing access to users, in some embodiments.

Multi-point to multi-point mesh topologies may be supported, as well as daisy-chain topologies. In a mesh network, a few backhaul connections may be shared among all nodes. With a multi-point to multi-point mesh, the backhaul needs of each mesh may be satisfied by reconfiguring the links in the mesh so that backhaul link load is spread out as symmetrically as possible across multiple wireless mesh links, in some embodiments, providing the same or similar user experience at each node with reduced delay over a bottlenecked backhaul configuration.

In some embodiments, two or more mesh networks may operate as semi-independent mesh clusters, linked via long-distance mesh links. The mesh clusters may share backhaul capacity with each other, and may share access to content hosting, caching, and other capabilities that may be available in one cluster but not all the others.

In some embodiments, the above features may be combined within a single network. For example, a mesh fabric, license-assisted backhaul and unlicensed assist may be combined with a MEC gateway to provide a self-configuring, self-optimizing, self-healing mesh network with flexible backhaul options for any user joining the mesh. The MEC gateway may provide a number of features, including coordinating the mesh nodes directly, facilitating communication between the mesh nodes of link and congestion conditions, facilitating handovers and communications to/from the core network, and other functions.

A description of several methods for improving delivery of media, such as video streams, over radio access networks follows.

In one method, predictive buffering at a gateway node is used to manage flow control across both RAN and TCP environments. The two environments have different strategies for providing QoS and flow management; transport control protocol (TCP), owing to its use on the public Internet, is resilient but does not take advantage of the speeds capable in a top-down control of an operator network or radio access network. TCP uses an exponential backoff strategy to exceed a maximum possible bandwidth and back off slowly before identifying a maximum steady state rate of delivery, which causes inefficiencies by requiring retransmission of packets and sometimes lengthy backoff delays. These methods guarantee delivery but take minutes to adjust to changed conditions.

By contrast, in a RAN, a centralized scheduler strictly allocates capacity, and errors and retransmissions are typically required because of deterioration in the radio link due to environmental factors, e.g., congestion, fading, user equipment (UE) motion, or other physical factors that affect the radio frequency (RF) propagation channel. Modulation changes may be used to increase or decrease data rates, but such changes are orchestrated by the base station directly. Retransmissions may be requested using, e.g., hybrid automatic repeat request (HARQ), but are intended not to be needed at all in an ideal scenario and should be avoided if possible as they reduce the efficiency of the channel.

The inventors have appreciated that improved efficiency could be achieved by avoiding TCP backoff on the wired network side, and by avoiding HARQs on the RAN side. To avoid TCP backoff, a buffering gateway in the middle of network between a UE and a media server can receive a data flow from the media server at a steady rate and can feed it to the UE as a back-to-back proxy or back-to-back user agent (B2BUA). The buffering gateway can silently handle HARQ requests or other retransmission requests originated by the RAN without causing disruption of the packet flow between the gateway and the media server, thereby avoiding backoff behavior. In effect, this approach separates flow control with the TCP media server from flow control with the RAN and UE.

To avoid HARQs on the RAN side, the base station may monitor the number of HARQs and, when the number exceeds a threshold, the base station may send a message to the buffering server to reduce the data rate. In turn, when radio conditions improve and a higher speed modulation is selected, the base station may send a message to the buffering server to increase the data rate.

Additionally, to further avoid HARQs on the RAN side, the causes of HARQ should be predicted and signals should be sent prospectively to the media server, e.g., before changes happen. For example, if the RAN is aware that radio conditions are deteriorating, or requires a modulation change resulting in a lower data rate, or a handover is about to occur, a RAN node can report this to the buffering gateway, which can in turn reduce the data rate of delivery of data to the UE before the RF channel change, which will ensure smooth data flow without requiring retransmission requests or HARQs.

Ordinary RAN signaling such as SINR reports, measurement reports, and HARQs themselves can be identified and sent to the buffering server. The RAN can inform the buffering server whether a transient interference event is taking place.

A separate timer for both the TCP and the RAN side may be maintained; in some embodiments both may be at the buffering server, or the RAN timer may be at the base station and the timers may be coordinated with the buffering gateway. IP packet sequence numbers may be tracked by the buffering server for both the RAN and the TCP media server, ensuring that even if HARQs or backoff do occur, each side sees the correct IP sequence number. Other aspects of state may be tracked by the gateway to provide proxy service to each side. Per-flow tracking, per-UE tracking for HARQ and other parameters, per-media server tracking, or other types of state tracking may be used. Packet reordering may be performed at the buffer.

In some embodiments, transcoding or transrating of the buffered video may be performed at the buffering gateway to further provide flexibility to the buffering gateway to enable the buffering gateway to increase or decrease the data rate heading toward the RAN. This may be coordinated with the base station.

Coordination between the base station and the buffering gateway may be using a proprietary protocol, a proprietary information element, an X2 application protocol (X2AP) protocol, or another protocol. X2AP protocol messages for communicating channel congestion and load may be used as described in 3GPP TS 36.423, incorporated herein by reference in its entirety. An application programming interface (API) may be used between the gateway and the base station.

In another embodiment, the inventors have appreciated that a reduction in resource consumption may be possible by reducing the impact of keepalives and by terminating connections. Stateful connections are common on the public Internet and with the TCP protocol, partly because the protocol was designed on a network infrastructure with different assumptions regarding cost, power, and resource reuse. This can be a problem when a server on the Internet sends a message to a UE that turns out to be only a "keepalive" message, e.g., a message containing no content but instead only requesting that the user respond to keep the connection alive. Transmission of such "keepalive" messages requires allocation of, and thereby unnecessary preemption of, radio resource blocks at the scheduler at the base station, as well as activation of UEs that may be in a power-saving IDLE state, which itself requires an expensive paging procedure.

These negative effects can be avoided by silencing the keepalive at an upstream gateway. The upstream gateway may perform shallow packet inspection on packets that come in, obtaining, e.g., source and destination IP and port and protocol for each packet, or other information required to identify a keepalive packet. If it is a keepalive, the packet may be silently discarded, in some embodiments, or sent to the RAN base station with a metadata flag indicating that it is a keepalive. The RAN may choose to allocate fewer or no resource blocks (RBs) to deliver the keepalive message, and may prioritize the allocation of RBs to other network users. In some embodiments, deep packet inspection may be used where shallow packet inspection is otherwise identified herein.

In some embodiments, a similar technique may be used to preemptively terminate TCP connections. Typically, in TCP, one side closes its connection by sending a FIN packet, which is answered by the remote side by an ACK packet. The other side then may close its connection by sending its own FIN and receiving its own ACK. However, it is possible to "half-close" a TCP connection by indicating that one end of a TCP connection is closed and not indicating that the other side is closed. For example, the second network node in the connection may choose not to send the second FIN packet. This results in leftover state at the first network node, which can result in a UE not going to IDLE and consequently wasting power until a lengthy timeout timer has expired.

To solve this problem, the upstream gateway may simulate to the RAN that a FIN has been received. The UE will then respond by completely closing the TCP connection and may go to IDLE. The upstream gateway may or may not subsequently wait for the remote end of the TCP connection terminate its connection.

In another embodiment, the inventors have appreciated that the RAN node, e.g., the base station or the eNodeB, has access to a significant amount of information that would be useful for optimizing performance of media flows, but that this information is not being made available to perform flow control, transrating, and other functions. In order to facilitate this, the inventors have contemplated the use of the coordinating upstream gateway as a back-to-back user agent (B2BUA) as described elsewhere herein, with additional improvements to enable the upstream gateway to provide improved flow control and transrating/transcoding.

Handovers have mechanisms, such as X2 data forwarding from the source base station to the target base station, that are meant to pass along data to the UE at its new serving cell. However, these mechanisms do not work effectively for low-latency, high-bandwidth video and other demanding real-time data flows. This results in a sudden loss in quality after the connection is handed over. This also results in a large amount of traffic being handed over unnecessarily from the source cell to the target cell.

At the base station, when a UE moves out to the cell edge or enters into a coverage area of a new cell, its signal at its serving cell becomes weaker, as evidenced by UE measurement reports and falling signal to noise ratio (SINR), received signal strength indication (RSSI), reference signal received power (RSRP), reference signal received quality (RSRQ), and other signaling strength metrics. Using at least these signal strength metrics, or optionally other metrics such as predictive analytics (such as described by U.S. patent application Ser. No. 14/936,267, PWS-71775US01), the base station is often able to determine that a UE should be handed over to another base station. In some cases the base station is able to initiate a handover; in other cases the base station is able to predict a UE-initiated handover. These mechanisms can be used to ameliorate the above problem.

In some embodiments, the serving base station which becomes aware of the impending handover of the UE informs a coordinating upstream gateway node. The upstream node is informed prospectively, before the handover occurs. The determination of UE handover may be made in various ways as described elsewhere herein. The upstream node may be serving as a B2BUA for serving the media flow, as described elsewhere herein.

Once the upstream node is notified that a handover will be initiated, it may immediately stop delivering data to the serving cell. This results in less data being required to be passed along from the serving cell to the target cell.

The upstream node may also provide transrating or transcoding to optionally provide lower quality video even while the handover is happening, by serving the data to the serving cell. Transcoding or transrating may be performed at the upstream node, or the upstream node may request and pass along lower quality media from the media's original source.

Once the handover is complete, the full quality video is immediately delivered to the target cell. Since the B2BUA is acting to hide the deterioration of quality from the media's source server, the full quality video has been sitting in a buffer at the upstream node and is immediately available to be sent. As well, the media source server has continued to deliver data in a timely manner without gaps to the B2BUA, which may permit the user to continue watching live video without interruption.

Figure 1:
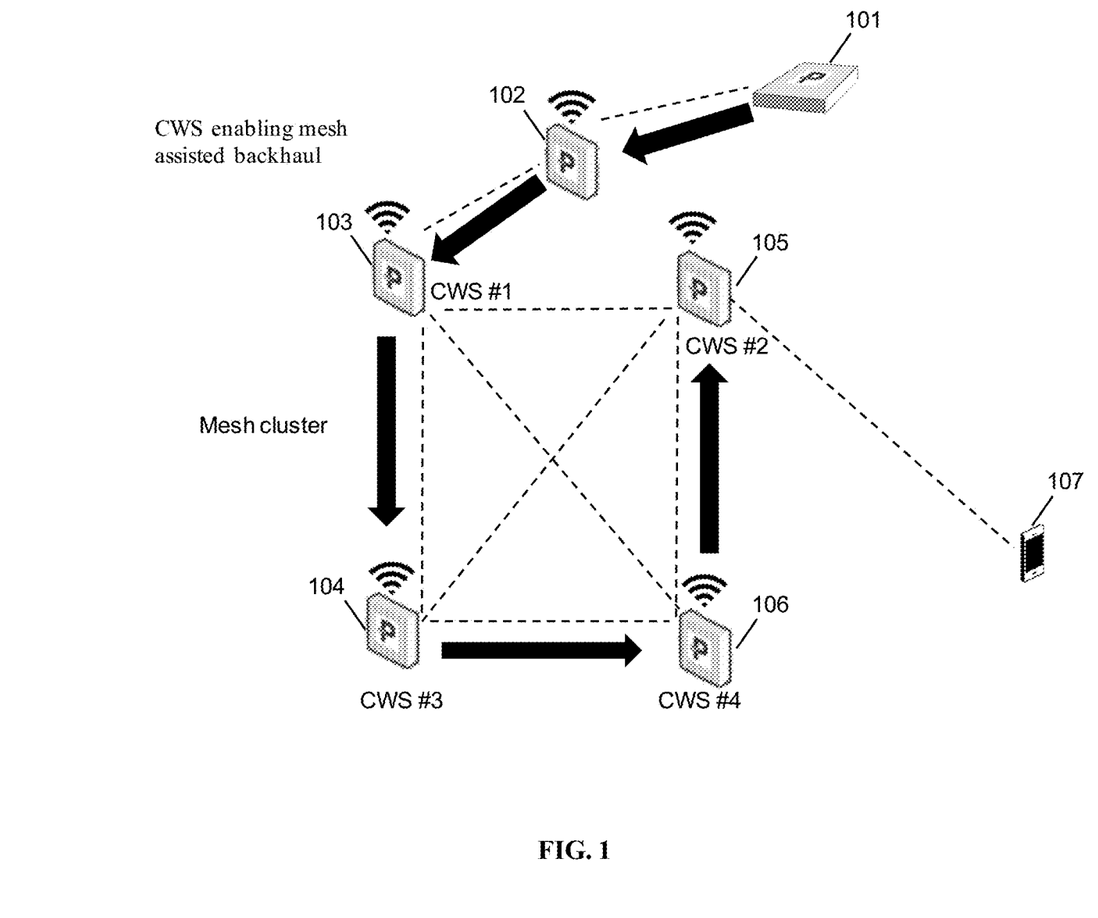
FIG. 1 is a system diagram showing a backhaul mesh network, in accordance with some embodiments.

FIG. 1 is a system diagram showing a backhaul mesh network, in accordance with some embodiments. Upstream gateway 101 has a content caching server functionality, and is located at the edge of a core network (not shown); gateway 101 is between the RAN and the core network. Base stations 102, 103, 104, 105, 106 are in a mesh cluster via Wi-Fi in a many-to-many topology. UE 107 is attached and connected to base station 105 only. However, in this example, the most direct route between UE 107 and gateway 101, via the radio link between base station 105 and base station 103, is not desirable, either because of congestion, poor link quality, or another reason. In this case the mesh network is able to reroute data from gateway 101 to base station 102, to base station 103, to base station 104, to base station 106, to base station 105 and to UE 107. In some embodiments, this route may be assigned or pushed down from gateway 101; in some embodiments, gateway 101 may obtain link quality and base station load, etc., from each of the base stations and may use this information to determine the best route. In some embodiments, the mesh network cluster itself may identify the best route.

Figure 2:
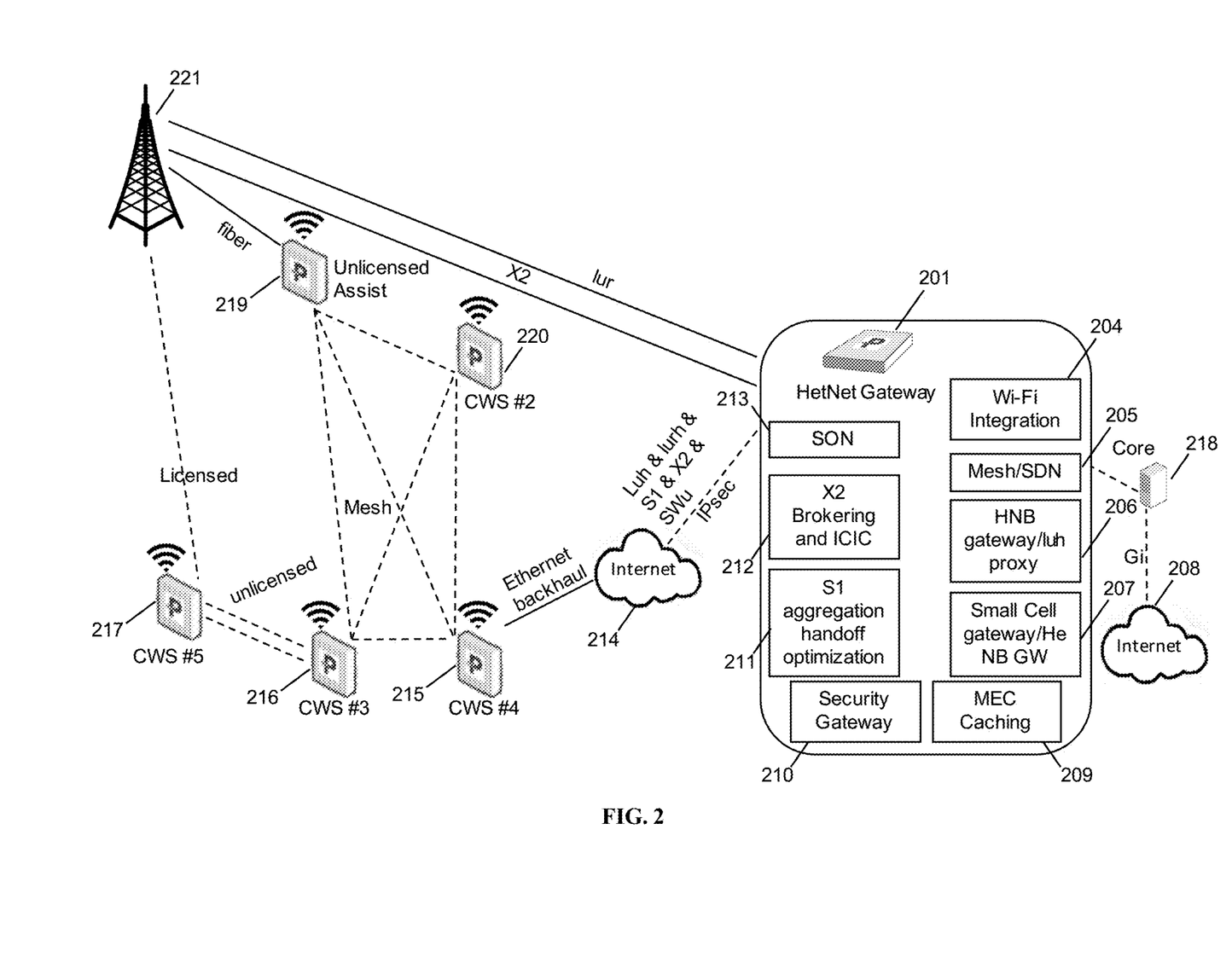
FIG. 2 is a second system diagram showing a mesh network with multiple backhaul options, in accordance with some embodiments.

FIG. 2 is a second system diagram showing a mesh network with multiple backhaul options, in accordance with some embodiments. Macro cell 221 is in communication with a gateway node 201, which is located at the edge of, and is in communication with, core network 218, which is also connected to the Internet 208. Macro cell 221 is in communication with the gateway node via both X2 and Iu interfaces. In some embodiments, an S1 interface or another interface may be supported as well or in place of these interfaces. The macro node is connected to the gateway node via a fiber connection (fiber backhaul).

Gateway node 201 supports, hosts or includes a number of functional modules, each of which may be used to support one or more of the mesh base stations and any UEs attached thereto. These modules include a self-organizing network (SON) module 213, an X2 brokering/inter-cell interference cancellation (ICIC) module 212, an S1 aggregation handoff optimization module 211, a security gateway module 210, a mobile edge computing cache (content cache) module 209, a small cell gateway/home eNodeB gateway (HENBGW) module 207, a homeNodeB gateway/Iuh proxy module 206, a mesh/software-defined networking (SDN) module 205, and a Wi-Fi integration module 204.

Turning to the radio access network, macro cell 221 is also in communication with mesh base station 219 via a fiber connection, which is a first backhaul link for the mesh network described below. Macro cell 221 is also in communication with base station 217 via an in-band, e.g., licensed, wireless backhaul connection. Base station 217 is connected via Wi-Fi (unlicensed backhaul) to base station 216. This is a second backhaul link for the mesh described below, and constitutes unlicensed assist (ULA) backhaul.

Base stations 219, 220, 215, and 216 are also connected in a many-to-many mesh network. This mesh network has several backhaul modalities: unlicensed assist (ULA) via base station 219 to macro 221; unlicensed assist via base stations 216 and 217 which is also connected via license-assisted backhaul (LAB) to macro 221; and wired backhaul via Ethernet from base station 215 to Internet 214, which permits access to gateway 201. A UE connected to one of the mesh nodes would have the benefit of all of these backhaul connections, shared or pooled among all the base stations in the mesh.

Figure 3:
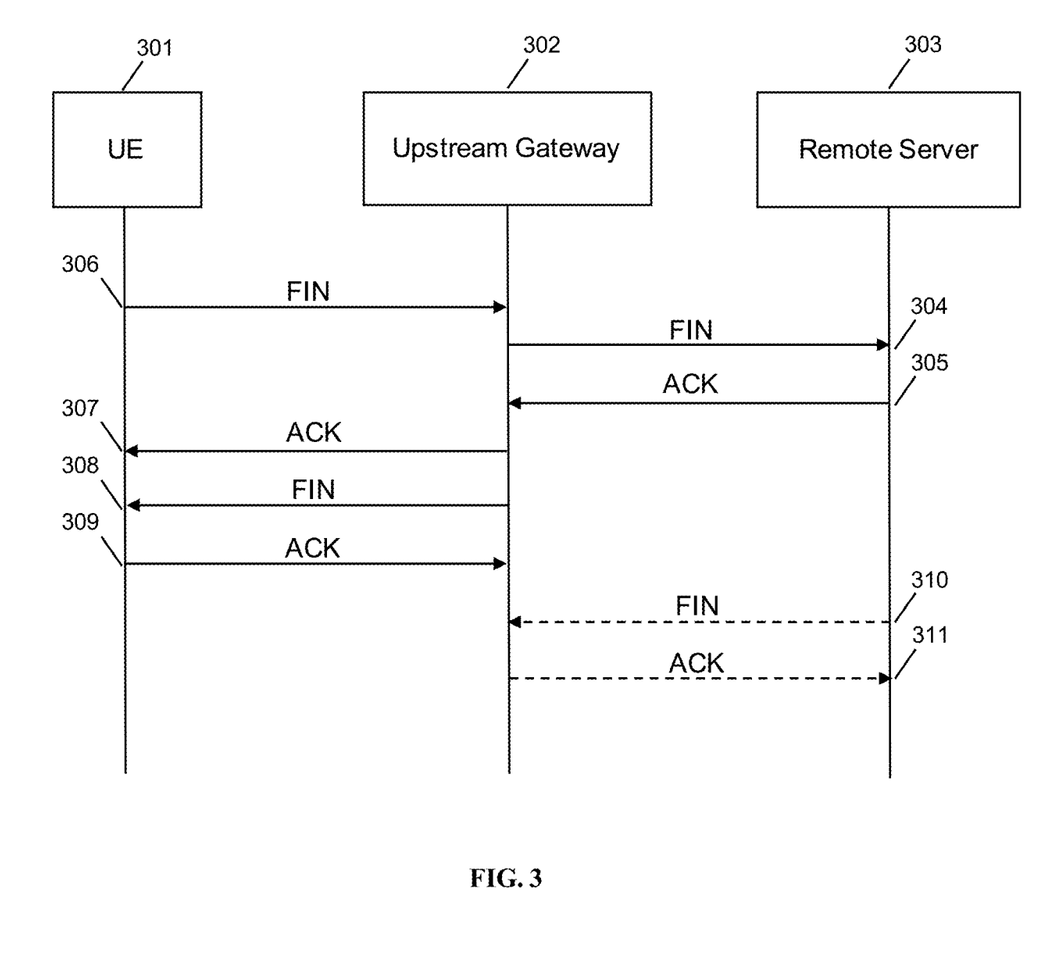
FIG. 3 is a flow diagram showing teardown of a TCP connection, in accordance with some embodiments.

FIG. 3 is a flow diagram showing teardown of a TCP connection, in accordance with some embodiments. UE 301 is in communication via upstream gateway 302 with remote server 303. UE 301's serving eNodeB is omitted for simplicity in the diagram. At step 306, UE 301 closes its connection down by sending a FIN packet, which is forwarded by gateway 303 to remote server 302 at step 304. At step 305, the remote server sends an ACK, which is forwarded back to the UE at step 307. However, the connection is now still only half-closed.

At step 308, immediately or after a very short timer (such as 1 ms or otherwise far shorter than a standard TCP connection timer, which may have a timer period of 2 minutes to 4 minutes), the upstream gateway 302 may act as a B2BUA to intervene in the connection by sending a FIN packet to UE 301. UE 301 understands that the connection is now fully closed, sends ACK packet 309, and closes down its TCP connection and releases all resources. UE 301 may, in some instances, go to an IDLE mode and disconnect from the network, saving power and reducing resource usage in the network. Upstream gateway 302 may or may not receive a final FIN 310 and send a final ACK 311 to remote server 302, but either way resources at the UE and RAN have already been saved.

Figure 4:
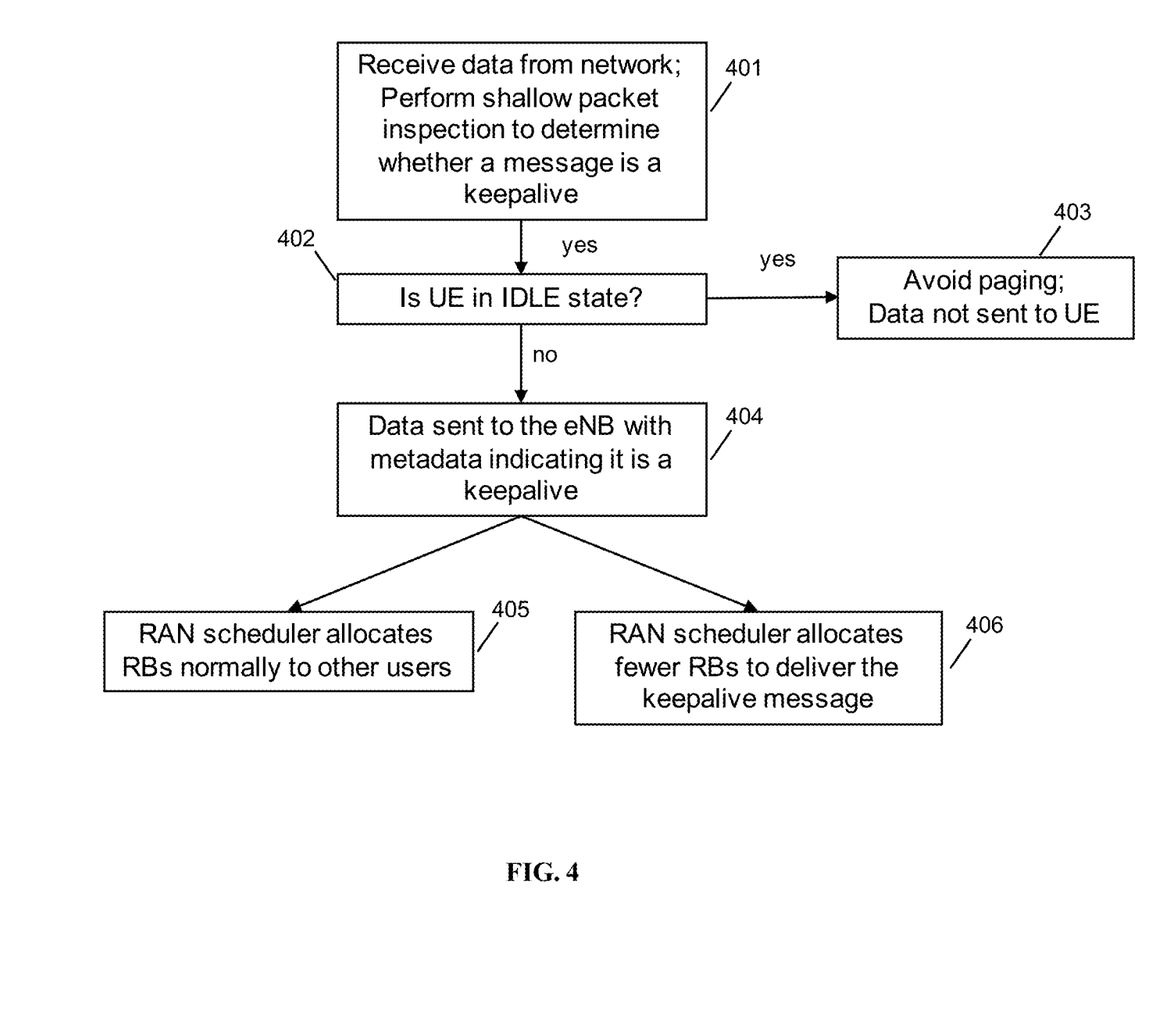
FIG. 4 is a flowchart showing keepalive handling, in accordance with some embodiments.

FIG. 4 is a flowchart showing keepalive handling, in accordance with some embodiments. At step 401, data is received from the network for a given UE at a coordinating gateway that is between an evolved packet core (EPC) and the serving base station; shallow packet inspection is used to determine whether a message is a keepalive or not. Once the message is known to be a keepalive, processing passes to step 402. At step 402, if the UE is in an IDLE state (e.g., in a power save state and not able to be contacted without paging), processing passes to step 403, where the keepalive message is silently discarded. If the UE is not in an IDLE state and is connected, at step 404, the data may be sent along to the serving eNodeB with metadata indicating that it is a keepalive packet.

At the eNodeB, two steps are performed concurrently. At step 405, the scheduler at the eNodeB allocates resource blocks normally to all users other than the UE which will be receiving only the keepalive packet. At step 406, the eNodeB schedules the delivery of the keepalive message, but allocates fewer resource blocks and/or gives the keepalive a lower priority.

Deep packet inspection may be used in place of or to supplement shallow packet inspection in various embodiments described herein.

Figure 5:
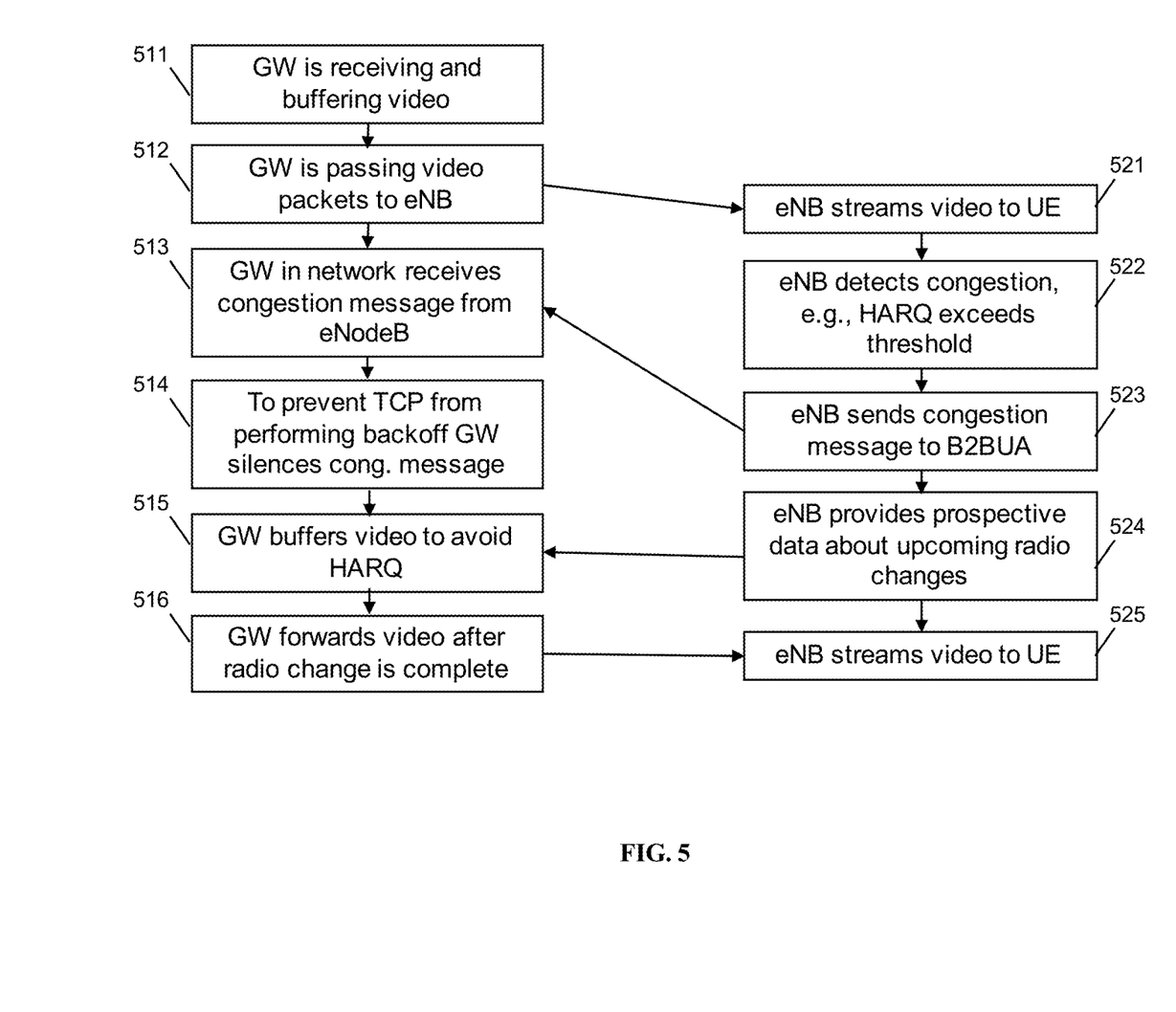
FIG. 5 is a flowchart showing predictive buffering with flow control, in accordance with some embodiments.

FIG. 5 is a flowchart showing predictive buffering with flow control, in accordance with some embodiments. The flowchart boxes on the left in the flowchart are steps performed by the upstream gateway, and the boxes on the right are steps performed by the eNodeB in this figure, although a different division of steps may be contemplated by one having skill in the art. The upstream gateway is located at the edge of the core network, i.e., between the eNodeB and the core network.

At step 511, the gateway is receiving and buffering video from a remote video server intended for a UE. At step 512, the gateway passes video to the eNodeB. Processing continues at the gateway; concurrently, at step 521, the eNodeB streams video to the UE. At step 522, the eNodeB detects congestion or poor radio link quality, etc., as described elsewhere herein. A HARQ counter may exceed a given threshold, in some embodiments. Once congestion has been detected, at step 523, the eNodeB messages the B2BUA at the gateway. Back at step 513, the gateway receives the congestion message. However, at step 514, to prevent TCP backoff from occurring between the gateway and the remote video server, the gateway does not slow down the rate at which it receives video from the video server, effectively silencing the congestion message.

At step 515, to prevent the UE from continuing to send HARQ requests on the now-known bad radio link, the gateway slows delivery of data to the eNodeB and buffers additional data. At step 524, concurrently, the eNodeB has determined that the UE is performing a radio change, such as going to a lower-speed modulation, and sends a notification to the gateway via, e.g., a special X2AP message or a special API. At step 516, the gateway waits for the radio change to complete and then sends as much of the buffered video to the eNodeB as makes sense given the radio link quality reported by the eNodeB. At step 525, the appropriate quantity of video data is sent to the UE at a radio link-appropriate rate.

Figure 6:
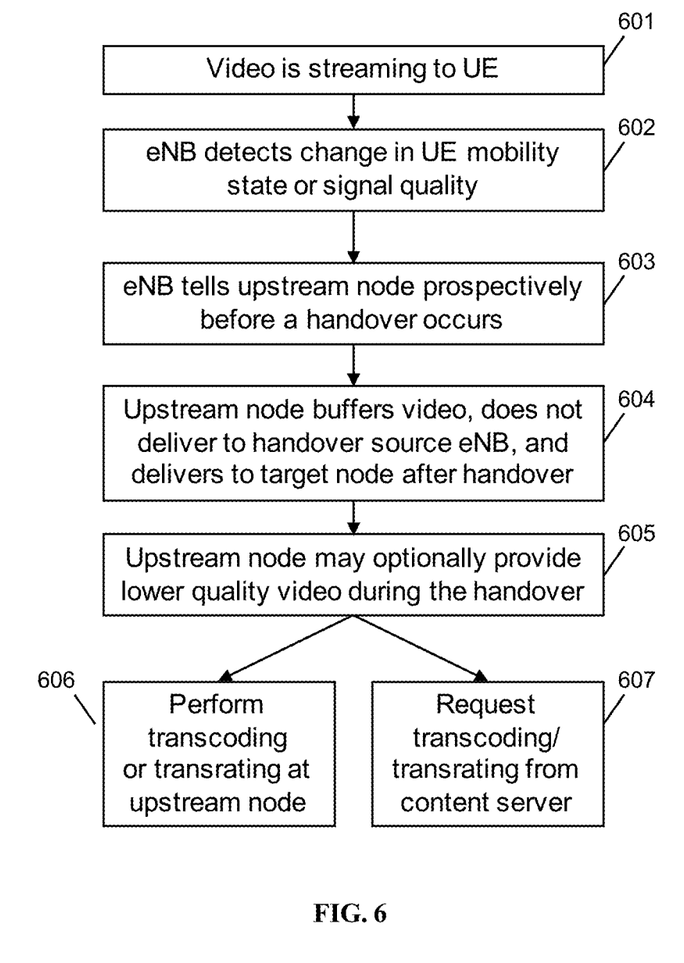
FIG. 6 is a flowchart showing video streaming with handover prediction, in accordance with some embodiments.

FIG. 6 is a flowchart showing video streaming with handover prediction, in accordance with some embodiments. At step 601, a user has requested a video at the user's device (the UE), and video is now streaming to the device from a remote server through a upstream gateway node located at the edge of an operator core network through to a radio access network (RAN) serving eNodeB base station. The upstream gateway node is acting as a B2BUA to present a uniform stream of data at an appropriate data rate to the eNodeB, and to insulate the remote server from changes to the radio link quality at the UE.

At step 602, the serving eNodeB for the UE detects a change in the signal quality of the UE; this may be, for example, a notification from the UE that it is initiating a handover to a target node, or a falloff in signal strength as identified by a measurement report, or a number of HARQ requests that exceeds a threshold, in each case being an event that will result in a handover. At step 603, the eNodeB informs the upstream gateway node, either via an API call or via an X2AP message or other message. The message may be prospective, i.e., before the handover occurs; the message may also be sent as close in time as possible to the initiation of the handover.

At step 604, the upstream node receives the prospective handover message. However, as it is acting as a proxy and B2BUA, it is able to elect not to pass any information along to the video streaming server, and with respect to the streaming server continues receiving the video and placing its data in a buffer. The upstream node may immediately elect not to deliver the video to the serving eNodeB. This prevents HARQs from occurring at the UE and reduces the data that must be transferred between the serving eNodeB and the target node to complete the handover.

The handover itself is performed according to the typical 3GPP handover procedure. As the upstream node is positioned as a gateway between the eNodeB and the core network, it also sits between at least the serving eNodeB and the mobility management entity (MME) in the core network. It is able, therefore to determine when the handover is complete. Once the handover completes, the upstream node is made aware of the handover completion and sends the data in the buffer directly to the target eNodeB.

At step 605, the upstream node may optionally provide lower quality video during the handover. During the handover, although the UE is temporarily not receiving data while it performs radio resource control (RRC) reconfiguration, the source eNodeB may continue to receive data and may forward the received data via a tunnel to the target eNodeB. Video data may be sent during this time from the upstream node; during the handover it is possible to provide lower quality video data, e.g., by reducing the resolution of the video or changing the bitrate.

At step 606 and 607, two options for providing the lower-quality video are shown. At step 606, the upstream node itself is called upon to take the video data that is currently stored in a buffer, and to perform transcoding/transrating of that video to a lower quality before sending the video down to the UE via the source eNodeB or target eNB. This does not require the upstream node to contact the video server but it does require the upstream node to perform a relatively computationally intensive procedure. At step 607, the upstream node may instead request transcoding/transrating from the content server, or may request a lower quality that may be available without transcoding, etc. This requires the upstream node to directly contact the video server as the B2BUA. Of course, in some embodiments, transcoding or transrating may be performed on any video passing through the upstream node, as described generally herein, not just during a handover.

Figure 7:
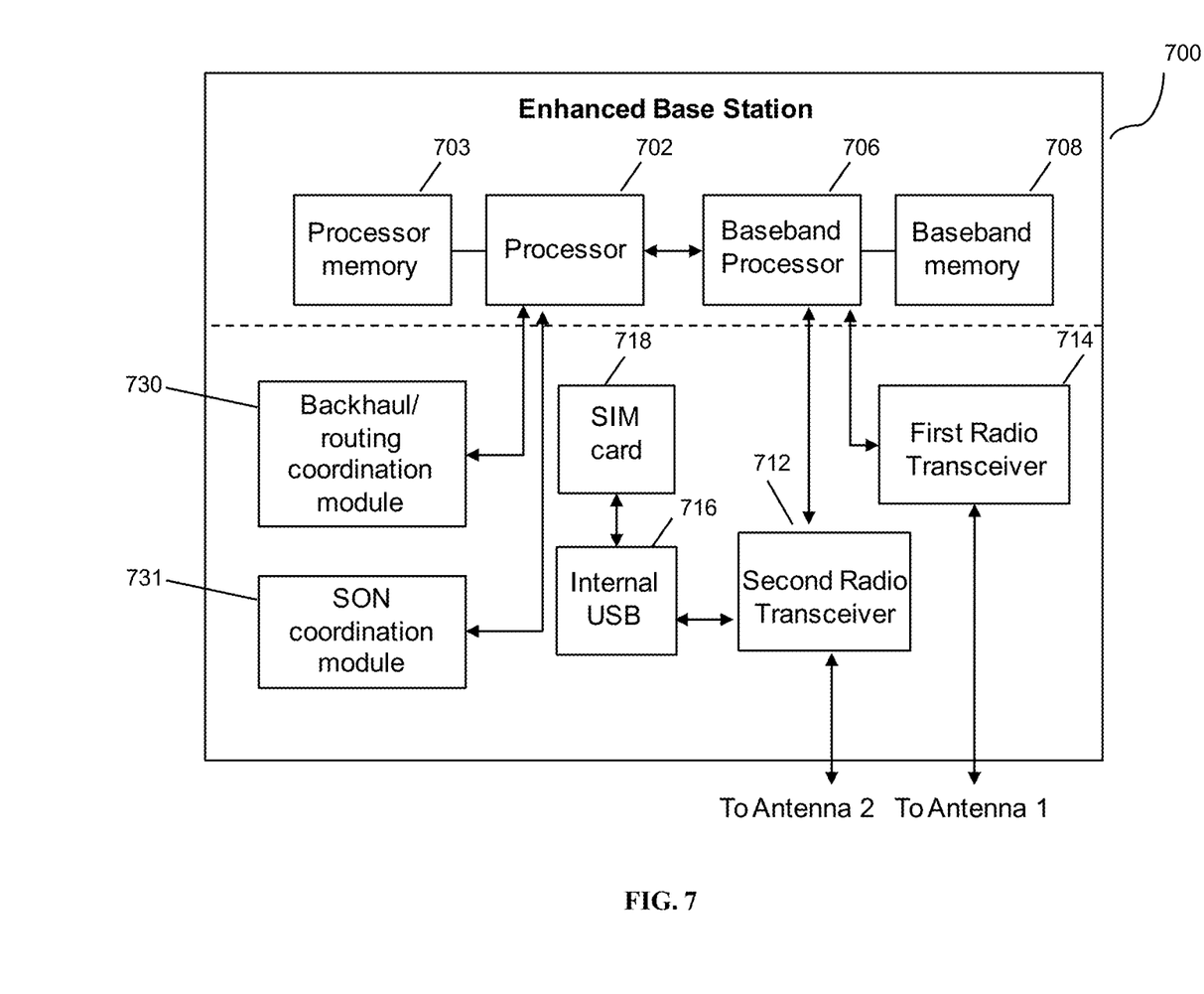
FIG. 7 is a schematic diagram of an enhanced base station, in accordance with some embodiments.

FIG. 7 is a schematic diagram of an enhanced base station, in accordance with some embodiments. Enhanced base station 700 may be an eNodeB for use with LTE, and may include processor 702, processor memory 704 in communication with the processor, baseband processor 706, and baseband processor memory 708 in communication with the baseband processor. Enhanced eNodeB 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716.

Processor 702 may communicate with an upstream gateway via self-organizing network (SON) coordination module 731, which may perform the buffering, flow control, radio congestion identification, X2AP communication, and other functions described herein. The SON module may be configured to provide transmit power increase/decrease functionality, radio band switching functionality, or communications with another remote SON module providing, for example, these types of functionality, in some embodiments.

Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 702.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), etc. Additional radio amplifiers, radio transceivers and/or wired network connections may also be included.

Processor 702 and baseband processor 706 are in communication with one another. Processor 702 may perform routing functions in conjunction with backhaul/routing coordination module 730, and may determine if/when a switch in network configuration is needed. Routes, backhaul information, and other information may be stored in module 730 or in a database, table, or in-memory data structure in memory 703.

Processor 702 may identify the appropriate network configuration, and may perform routing of packets from one network interface to another accordingly. Processor 702 may use memory 704, in particular to store a routing table to be used for routing packets, and may use memory 704 to store one or more routing table of routing coordination module 730. Routes may be pushed to other mesh nodes as required by rules in backhaul/routing coordination module 730 or based on instructions received at SON coordination module 731 from other nodes or from an upstream coordinating server.

Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Figure 8:
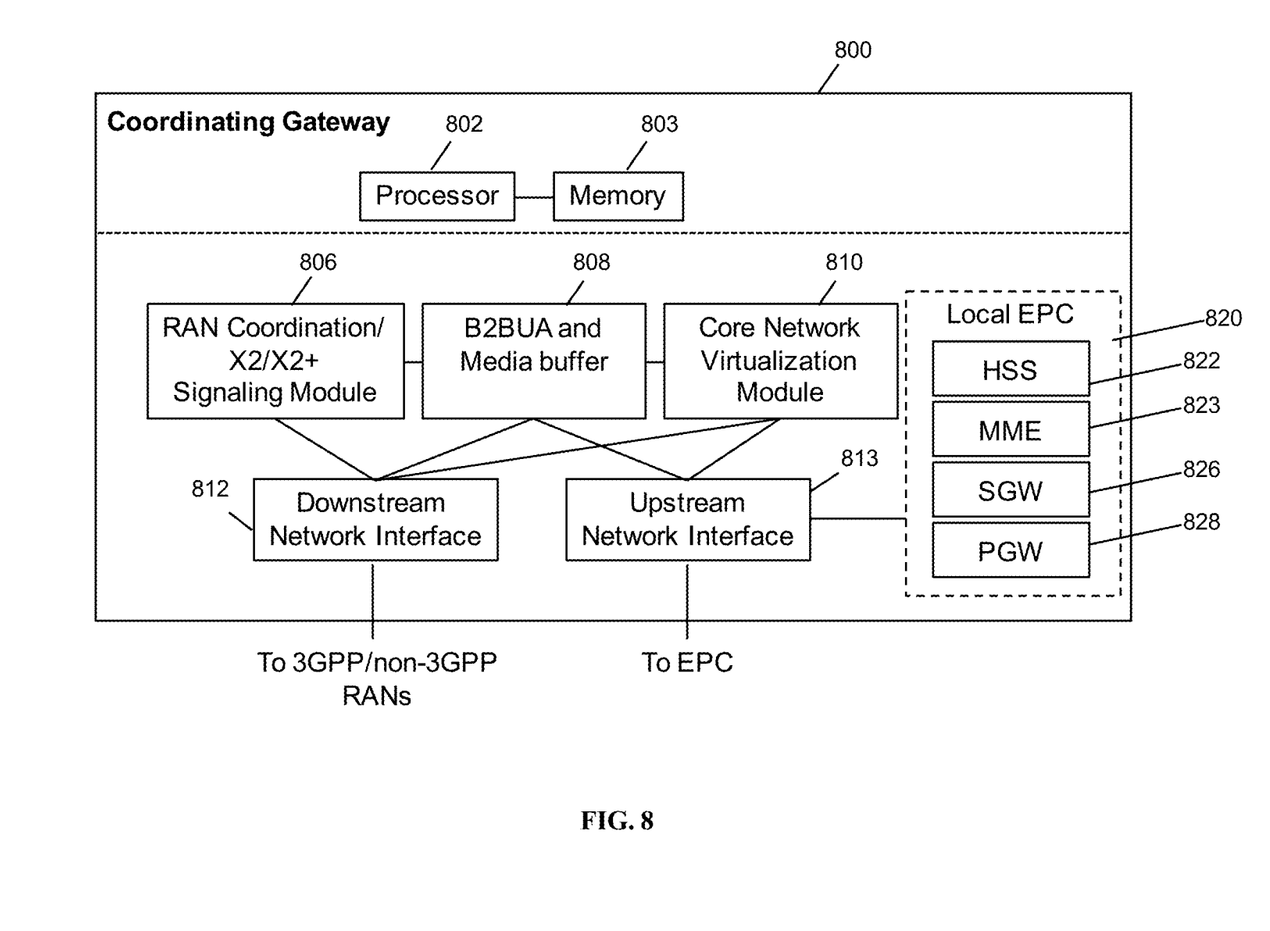
FIG. 8 is a schematic diagram of a signaling coordinator server, in accordance with some embodiments.

FIG. 8 is a schematic diagram of a coordinating gateway, in accordance with some embodiments. Coordinating gateway 800 includes processor 802 and memory 804, which are configured to provide the functions described herein. Also present are radio access network coordination/X2/X2+ signaling (RAN Coordination and signaling) module 806, back to back user agent (B2BUA) and media buffer 808, and core network virtualization module 810. In some embodiments, coordinator server 800 may coordinate multiple RANs using coordination module 806. In some embodiments, coordination server may also provide proxying, routing virtualization and RAN virtualization, via module 810. In some embodiments, buffering and proxying of media may be performed by module 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet). Signaling suppression functions as described within may be performed in module 806.

Coordinating gateway 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. Although the present disclosure uses LTE as an exemplary embodiment, the other protocols or air interfaces, such as the various air interfaces listed in this paragraph, may be substituted as would be apparent to one having skill in the art.

The words "stream," "flow," and others used herein may have the same meaning as used herein. The techniques described herein may be used with any real-time data stream, including video, voice, voice-over-IP (VOIP), interactive sessions, guaranteed bit rate data, emergency data, management data, or other time-sensitive data. Other protocols may be used instead of, e.g., TCP, including stream control transmission protocol (SCTP).

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method using mobile edge computing (MEC) for providing video, comprising:
   receiving, at a User Equipment (UE), video from a content server, through an upstream node presenting the video as a uniform stream of data at an appropriate data rate and insulating the content server from changes to the radio link quality at the UE;
   detecting, by a source base station, a change in UE mobility state or signal quality;
   notifying, by the source base station, the upstream node before a handover occurs from the UE;
   receiving, by the upstream node, the prospective handover message;
   buffering, by the upstream node, the video using MEC;
   refraining from delivering the video to the source base station; and
   delivering, by the upstream node, the video after the handover occurs.

2. The method of claim 1 wherein using MEC comprises performing transcoding at the upstream node.

3. The method of claim 1 wherein using MEC comprises performing transrating at the upstream node.

4. The method of claim 1 wherein using MEC comprises requesting transcoding from the content server.

5. The method of claim 1 wherein using MEC comprises requesting transrating from the content server.

6. The method of claim 1 further comprising providing, by the upstream node, lower quality video during the handover.

* * * * *